United States Patent
Woodruff

(10) Patent No.: US 6,625,927 B2
(45) Date of Patent: Sep. 30, 2003

(54) PLANT CONTAINERS

(76) Inventor: Keith F. Woodruff, 1331 Summit La., Mountainside, NJ (US) 07092

( * ) Notice: Subject to any disclaimer, the term of this patent is extended or adjusted under 35 U.S.C. 154(b) by 16 days.

(21) Appl. No.: 09/877,746

(22) Filed: Jun. 8, 2001

(65) Prior Publication Data

US 2003/0159351 A1 Aug. 28, 2003

(51) Int. Cl.$^7$ ................................................ A01G 9/02
(52) U.S. Cl. ........................................................ 47/65.5
(58) Field of Search ................................ 47/66.1, 66.3, 47/66.4, 66.7, 67, 81, 48.5; 248/206.2, 206.4

(56) References Cited

U.S. PATENT DOCUMENTS

| | | | | |
|---|---|---|---|---|
| 1,557,712 A | * | 10/1925 | Little | 47/65.6 |
| 2,698,155 A | * | 12/1954 | Bowman | 206/806 |
| D176,842 S | * | 2/1956 | D'Ath | 248/206.4 |
| 3,747,268 A | * | 7/1973 | Linder | 248/539 |
| 4,137,668 A | * | 2/1979 | Kojo | 47/66.1 |
| 4,499,688 A | * | 2/1985 | Droll | 47/83 |
| 4,837,972 A | * | 6/1989 | Reed | 47/67 |
| 5,028,026 A | * | 7/1991 | Philipps et al. | 248/206.1 |
| 6,287,655 B1 | * | 9/2001 | Nichols, Jr. | 156/66 |

FOREIGN PATENT DOCUMENTS

| | | | |
|---|---|---|---|
| DE | 3311750 | * | 4/1984 |
| SE | 610717 | * | 5/1979 |

* cited by examiner

Primary Examiner—Charles T. Jordan
Assistant Examiner—Francis T. Palo
(74) Attorney, Agent, or Firm—Mark P. Stone

(57) ABSTRACT

A plant container has a semi-spherical opened top cup-shaped receptacle permanently attached to a vertical back panel. The cup and back panel form a pocket for retaining soil for a plant. The back panel has at least one opening for receiving a mounting element, such as a suction cup, for removably mounting the container to a vertical supporting surface, as for example, a window pane. The back panel also defines a reservoir for water and openings in communication with the receptacle for watering a plant received in the receptacle.

17 Claims, 6 Drawing Sheets

PLANT CONTAINERS

BACKGROUND OF THE INVENTION

The present invention is directed to a removably mountable container for potted plants.

Conventional containers for plants are generally provided by pots or baskets having a flat horizontal bottom surface. The containers are supported on the horizontal bottom surface by a horizontal supporting element, as for example, a floor, a table top, a desk top, or a window sill. Such pots occupy valuable space which can be used to accommodate other articles. Additionally, it is desirable to place such containers close to windows or glass doors to provide the necessary light requirement for the plant. However, placing the containers on floor space proximate to windows or doors blocks access to the windows or doors, and placing the containers on elevated window sills creates a risk that the container will fall.

It is the primary object of the present invention to provide a plant container which is not supported on a horizontal bottom surface, but is adapted to be mounted to a vertical supporting surface including a window or glass door.

Other objects and advantages of the present invention will become apparent from the following description in conjunction with the drawings.

SUMMARY OF THE INVENTION

A plant container is formed from a cup-shaped receptacle attached to a vertical back panel to define a pocket for retaining soil. Preferably, the cup-shaped element is a truncated, semi-spherical element, and is either permanently mounted or integrally joined to the vertical back panel. Both the cup-shaped element and the back panel are preferably formed from a lightweight durable and flexible material, such as a plastic, which is also transparent to permit transmission of light therethrough to the plant retained therein. The vertical back panel of the plant container defines a reservoir for holding water. Openings are also provided for fluid communication between the reservoir and the cup-shaped receptacle for watering a plant received in the receptacle.

Means are provided for removably mounting the container to a vertical supporting surface. The mounting means include one or more suction cups mounted to the back vertical panel of the container, or in the alternative, adhesive strips mounted to the back panel of the container. In this manner, the container is removably mountable to different vertical supporting structures, as desired by the user. For example, the container may be mounted directly to a glass door or a window pane, or may be mounted to a vertical wall in close proximity to a window or glass door. In this manner, the container is selectively movable into different positions, and does not occupy floor space, window sill space, or other horizontal space such as a desk top or table top. When direct sunlight is desired, the container is mountable directly to a window pane to receive maximum sunlight. However, when desired, the container is readily removable and mountable to a vertical supporting surface remote from a window or other light receiving locations.

Although, in the preferred embodiment of the invention the container is formed from a transparent material to permit maximum light transmission therethrough, the container may also be formed from a less light transmissive material as might be desired for the growth of a particular plant.

Moreover, although in the preferred embodiment of the invention means, and in particular suction cups, are provided for removably mounting the container to a supporting surface, it is also within the scope of the invention to permanently or semi-permanently mount the plant container to a supporting surface. Such permanent and semi-permanent mounting means include known adhesives and epoxies.

DESCRIPTION OF THE BEST MODES FOR CARRYING OUT THE INVENTION

Figure 1:
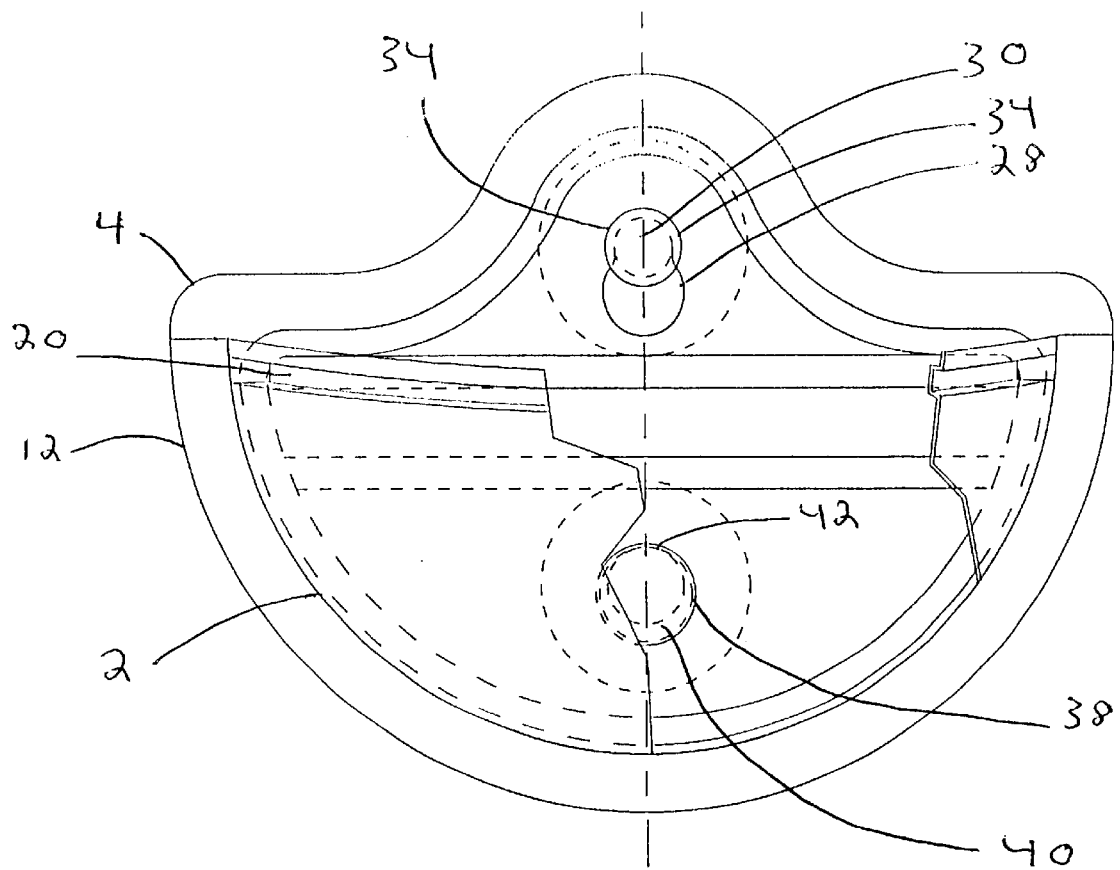
FIG. 1 illustrates a front elevational view of a plant container in accordance with the present invention.

FIGS. 1–6 of the drawing illustrate the preferred embodiments of the improved plant containers in accordance with the present invention.

Figure 2:
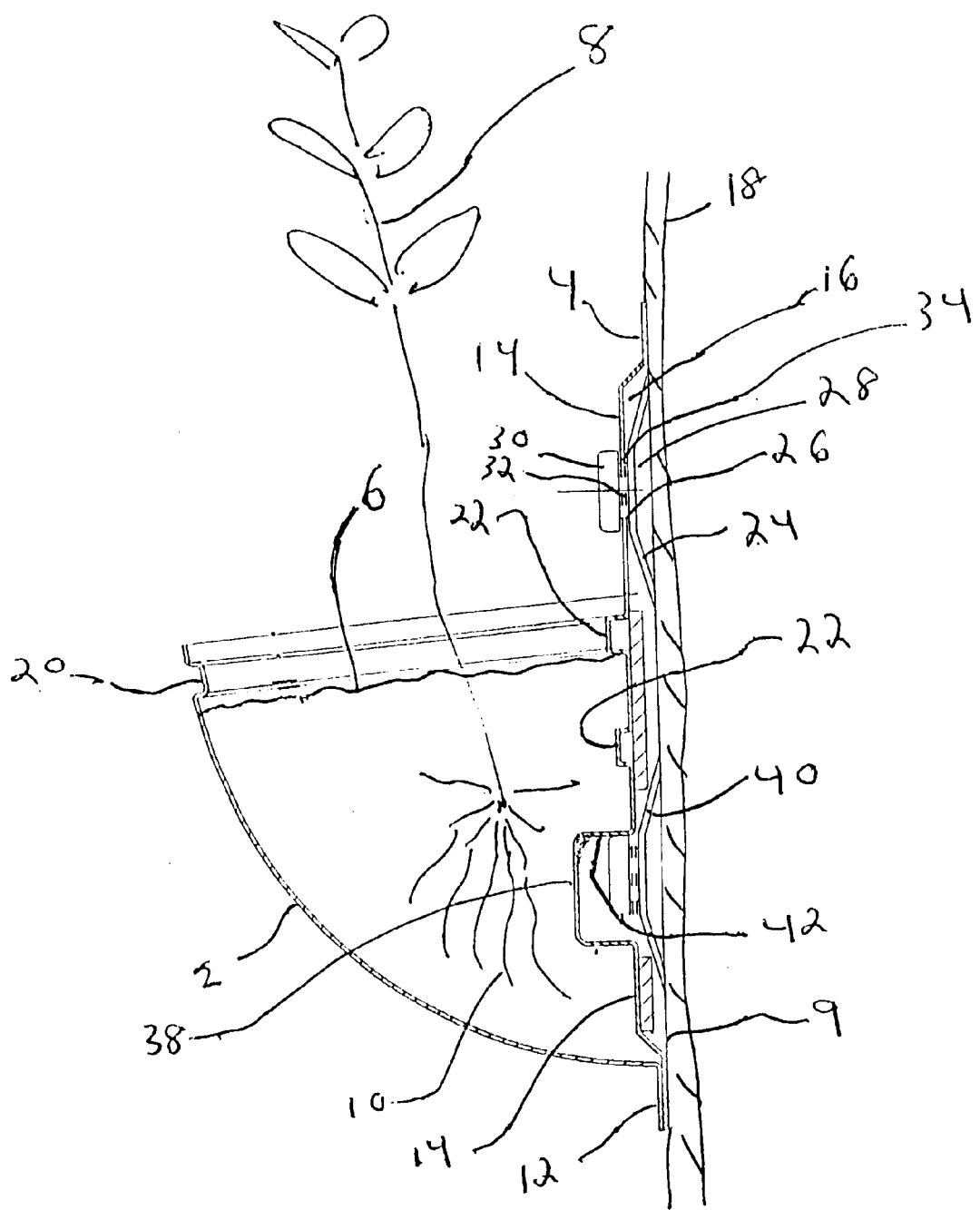
FIG. 2 illustrates a side elevational view of the plant container illustrated by FIG. 1 mounted to a vertical supporting surface.
Figure 3:
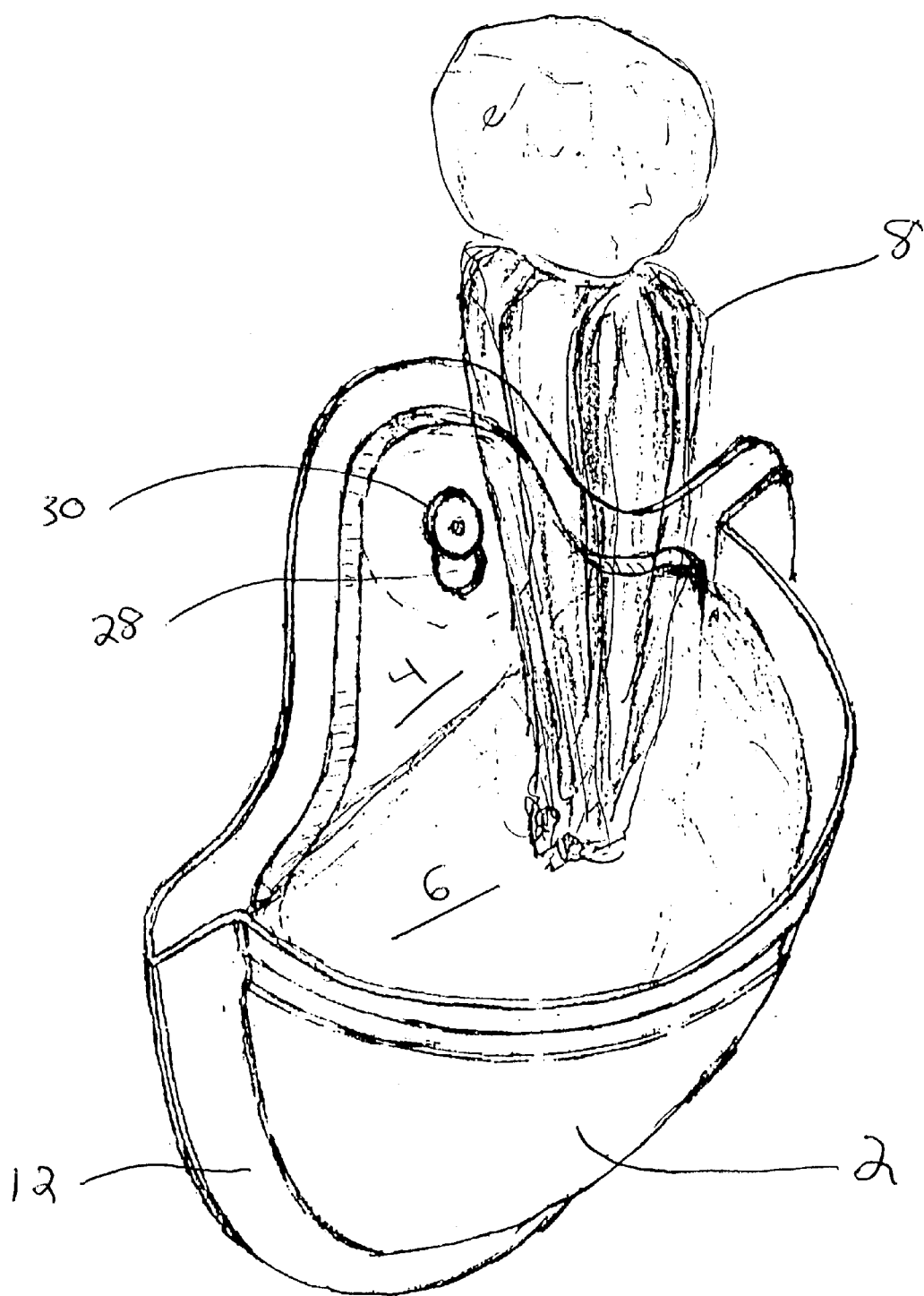
FIG. 3 is a perspective view of the plant container illustrated by FIGS. 1 and 2.

The container is formed from a generally cup-shaped element or receptacle designated by reference numeral 2, which is permanently attached to a vertical back panel designated by reference numeral 4, to form a pocket-like structure. In the alternative, the back panel 4 can be formed integrally with the cup-shaped element 2. Preferably, the cup-shaped element is an open-top truncated semi-spherical structure formed from a quarter section or quadrant of a sphere as best illustrated by FIGS. 2 and 3. Additionally, both the cup-shaped receptacle 2 and the back panel 4 are preferably formed from a durable, lightweight and resilient material, as for example, a lightweight plastic. As will be discussed in greater detail below, the material forming the cup-shaped element 2 and the back panel. 4 are preferably transparent to permit maximum light transmission into the container structure.

As best illustrated by FIGS. 2 and 3, the cup-shaped receptacle 2 of the container is adapted to hold soil, the upper level of the soil in the container being designated by reference numeral 6. FIG. 2 also illustrates a plant 8, having roots 10, growing in the soil 6.

The cup-shaped receptacle 2 is joined to and merges with the back panel 4 along a flange designated by reference numeral 12. The cup-shaped portion 2 is permanently connected to the back panel 4 along the flange 12. In the alternative, the cup-shaped receptacle 2 is integrally joined to the back panel 4 along the peripheral flange 12.

As best illustrated by FIG. 2, the rear panel 4 has a center portion 14 which is indented inwardly in a direction towards the cup-shaped receptacle 2. In this manner, an air pocket or space 16 is defined between the recessed portion 14 of the back panel 4 and a vertical supporting surface 18 to which the container is mounted. Vertical supporting surface 18 is preferably a window pane or a glass door so that the plant 8 is exposed to direct sunlight transmitted through the supporting surface 18 and through the transparent back panel 4 and the cup shaped receptacle 2.

FIGS. 1 and 2 illustrate a rib 20 extending around the periphery of the opened top of the cup-shaped receptacle 2. The rib provides rigidity, to the cup-shaped receptacle and also serves to retain the soil 6 within the receptacle. As best illustrated by FIG. 2, at least one horizontally extending rib 22 is defined by the inwardly recessed portion 14 of the back panel 4. The rib 22, which is recessed inwardly in a direction into the cup-shaped receptacle 2, provides rigidity to the rear horizontal panel 4 and tends to prevent concave bowing of the rear panel 4 when the container is mounted to the vertical supporting structure 18.

In accordance with the preferred embodiment of the present invention as illustrated by FIGS. 1–3, the plant container is removably mountable to the vertical supporting surface by at least one mounting element illustrated in the drawing as upper suction cup 24. The suction cup is mounted to the plant container through an opening or slot 28 defined in the inwardly recessed portion 14 of the rear panel 4. The cup portion 26 of the suction cup extends into the space 16 defined by the recessed portion 14 of the rear panel, and faces the vertical supporting surface 18 for engagement therewith. The rear portion 30 of the suction cup extends in the opposite direction through the recessed portion 14 of the rear panel 4 such that an intermediate portion 32 in the suction cup engages an upper edge 34 defined around the slot 28 to support the rear panel 4 on the suction cup as a result of gravitational forces on the plant container when the suction cup engages the vertical supporting surface 18 to removably mount the plant container to the vertical supporting surface. In this manner, the plant container is removably mountable by the upper suction cup 24 to a predetermined location on the vertical supporting surface 18. When desired, the plant container can be removed from the suction cup, and the suction cup can be mounted to a different predetermined location for removably mounting the plant container to that different predetermined location.

In most situations, the use of a single upper suction cup 24, as discussed above, will be sufficient to removably mount the plant container to a predetermined position on the vertical supporting surface 18. If necessary, a second lower suction cup may also be employed. FIG. 2 illustrates a recessed section 38 defined near the lower end of the recessed portion 14 of the rear panel 4. The recessed portion 38 extends inwardly into the space defined by the cup-shaped receptacle 2. A second, lower suction cup, designated by reference numeral 40, extends into the recess 38, and engages the top surface 42 of the recess when the suction cup 40 is mounted to the vertical supporting surface 18. In this manner, the plant container is supported at both the upper and lower portions of the rear panel 4 when the plant container is removably mounted to the vertical supporting surface 18.

Figure 4:
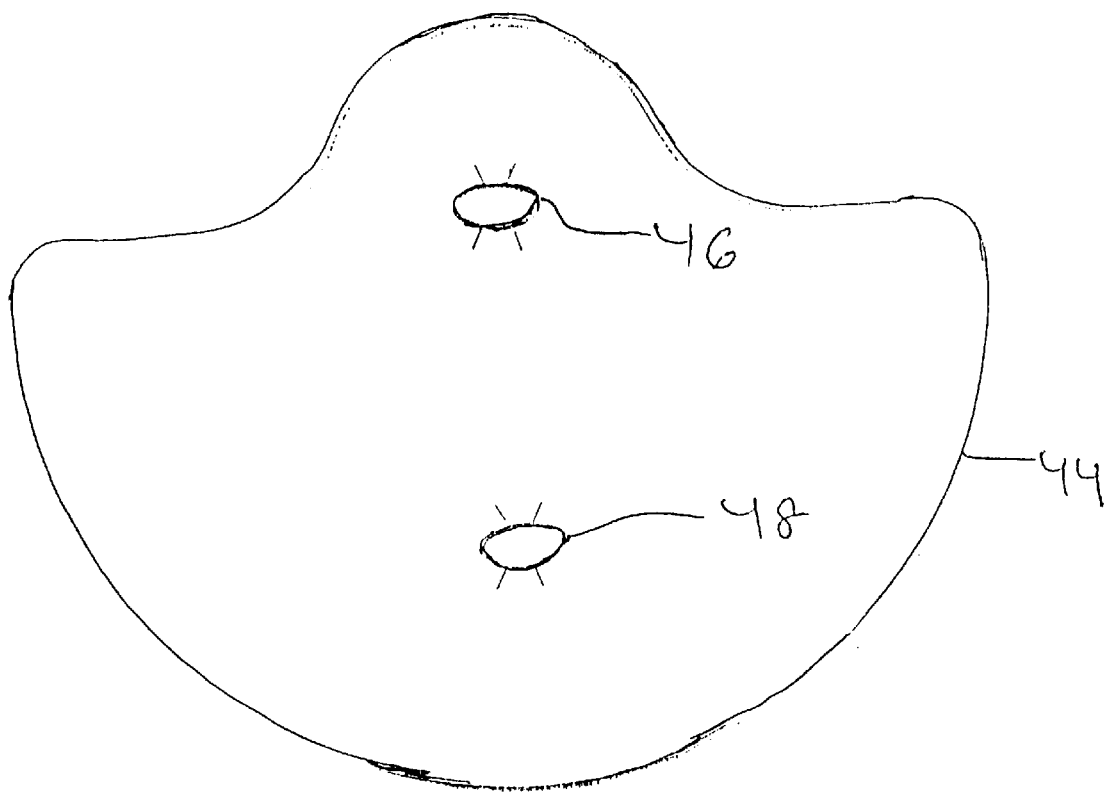
FIG. 4 illustrates a pattern used for locating the position at which the plant container in accordance with the present invention is mounted to a vertical supporting surface.

FIG. 4 illustrates a template or pattern designated by reference numeral 44, configured in the shape of the rear panel 4 of the plant container. The pattern 44 can be formed from cardboard or other suitable material. An upper opening 46, and a lower opening 48, are defined in the pattern 44. The upper opening 46 is in registration with the upper opening 28 in the recessed portion 14 of the rear panel 4, and the lower opening 48 is in registration with the lower recess 38 defined in the recessed portion 14 of the rear panel 4, when the pattern 44 is placed in registration with the rear panel 4 of the plant container. Suction cup 24 is removably receivable in the opening 46 in the pattern 44, and suction cup 40 is removably receivable in the opening 48 in the pattern 44. In this manner, the pattern 44 is used to locate the desired position at which the plant container is to be mounted to the vertical supporting surface 18. When this position is located, the suction cups received in the openings 46 and 48 of the pattern 44 are mounted to the vertical supporting surface 18, and the pattern 44 is removed from the suction cups 24 and 40. The, plant container is then mounted to the vertical supporting surface 18 by inserting the rear portion 30 of suction cup 24 through the upper opening or slot 28 of the recessed portion 14 of the rear panel 4, and by inserting the rear portion of suction cup 40 into the recess 38.

It is clear from the above description that the plant container in accordance with the present invention is readily mountable to any desired vertical supporting surface, and is readily removably from a supporting surface and removably mountable to a different selected supporting surface. Preferably, the plant container is mounted to a window or glass door during daylight hours to receive maximum sunlight transmitted through the transparent rear panel 4 and cup shaped receptacle 2. This is particularly helpful to the plant during the shortened daylight hours of winter, or during days of limited sunlight. During periods of no natural sunlight, the plant container is easily removed from one mounting location and removably mountable to another location, as for example a location proximate to a lamp or other source of artificial light.

In the preferred embodiments of the invention, the rear panel 4 and the cup-shaped receptacle 2 are both formed from a transparent material to maximize the transmission of light therethrough. However, it is within the scope of the invention to form these elements from less light transmissive materials for different types of plants which do not require maximum light exposure.

In the embodiment of the invention illustrated by FIGS. 1–4, the plant container is removably mountable to a vertical supporting surface by at least one suction cup. The use of a suction cup as the mounting means is advantageous because it does not deform the vertical supporting surface to which it is mounted, it is inexpensive, and does not require any anchor element. However, removable mounting means other than suction cups, as for example adhesive strips including Velcro material, or other known removable mounting means, are within the scope of the invention.

Figure 5:
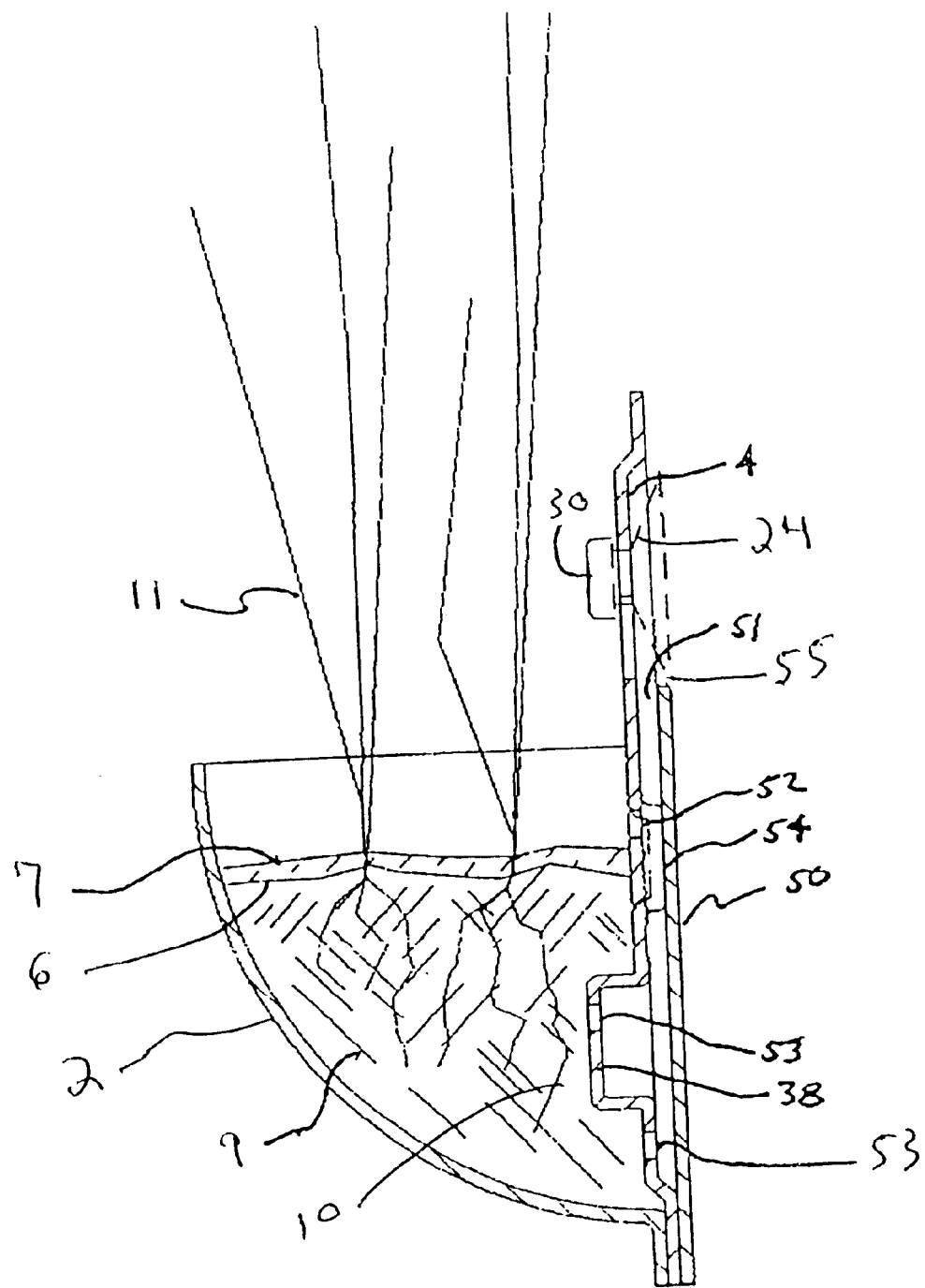
FIG. 5 is a side elevational view of a second embodiment of a plant container in accordance with the present invention.
Figure 6:
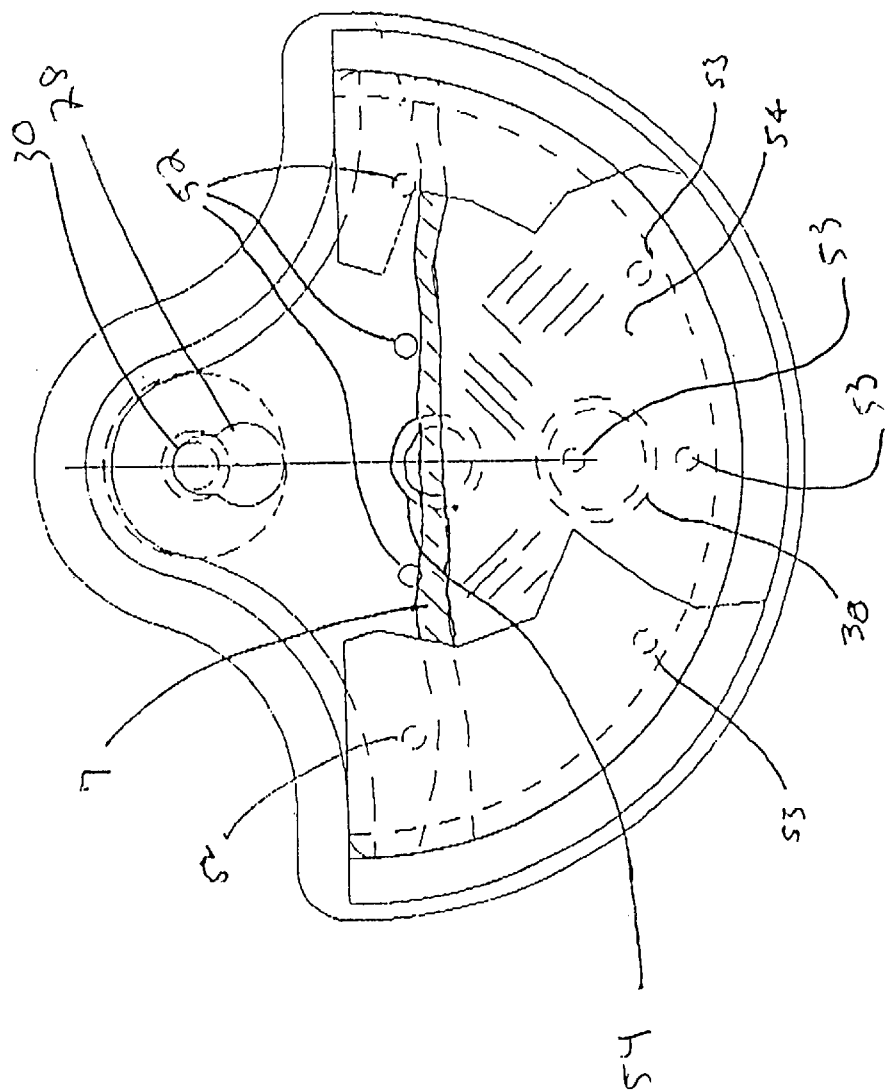
FIG. 6 is affront elevational view of the plant container illustrated by FIG. 5.

FIGS. 5 and 6 illustrate a second embodiment of a plant container in accordance with the present invention. Elements in FIGS. 5 and 6 corresponding the elements illustrated in FIGS. 1–4 will be designated by the same reference numerals. Although the FIGS. 5 and 6 embodiment show that the plant container is removably mounted to a supporting surface by a suction cup 24, having a rear portion 30 extending through a slot 28 in the rear panel 4, it is also within the scope of the invention to permanently or semi-permanently mount the plant container to a supporting surface by known adhesive materials or epoxies.

As best illustrated by FIG. 5, the plant container includes a second vertical panel 50, spaced rearwardly behind vertical panel 4, to define a space 51 between the panel 50 and a portion of the panel 4. Upper openings 52 defined in the rear panel 4 are in fluid communication with the upper portion of the cup-shaped receptacle 2. As illustrated by FIGS. 5 and 6, the upper openings 52 are defined above both the upper soil surface designated by reference numeral 6 and a layer of clay, designated by reference numeral 7, which is formed above the upper surface of the soil as will be discussed in greater detail below. The vertical panel 4, including the recessed portion 38, define lower openings 53. The lower openings are in fluid communication with the soil 9 received in the receptacle 2, in close proximity to the roots 10 of the plant 11 received in the receptacle. A raised boss 54 is provided between the vertical panels 4 and 50 to enhance the rigidity of the plant container, and to reduce warping of the plant container when it is mounted to a supporting surface.

In the embodiment illustrated by FIGS. 5 and 6, soil 9 is initially placed into the receptacle 2, and the plant 11 is rooted in the soil. Clay is initially applied above the upper surface of the soil in granular particles. Thereafter, water is poured into the opened top of the receptacle 2. The water both moistens the granular particles of clay and penetrates into the soil 2 proximate to the plant roots. The moistened clay particles thereafter dry and form a flat mat-like surface layer above the top surface of the soil 9 in the receptacle 2. Any excess water poured into the receptacle 2 overflows into the reservoir 51 through the upper openings 52. As the moisture in the mat-like clay surface evaporates, the clay hardens to form a layer above the top surface of the soil. Preferably, a layer of silicon, vegetable oil, or other moisture retarding substances are sprayed above the top hardened clay layer to form a water impermeable barrier 7 above the top surface of the soil. Thereafter, water poured into the opened top of the receptacle 2 will not penetrate through the layer 7, but will overflow into the reservoir 51 through the upper openings 52. The water in the reservoir 51 is introduced into the soil 9 proximate to the roots 10 of the plant 11 through the lower openings 53. The water introduced into the soil 9 through the lower openings. 53 is retained in the soil by the water impermeable upper layer 7. The opening 55 defined at the top of the reservoir 51 permits air to be vented from the reservoir when water is introduced into the reservoir through the upper openings 52.

The capacity of the reservoir is enhanced as a result of the increased volume provided by the inwardly recessed portion 38 of the vertical panel 4. Preferably, at least one opening 53 is defined in the recessed portion 38 to provide fluid communication between the recessed portion and the soil within the receptacle 2. The recessed portion 38, which extends into the soil 9, serves a further function by helping to retain the soil within the receptacle 2 in the event that the plant container is inverted.

The embodiment of the plant container disclosed by FIGS. 5 and 6 provides means for assuring that the moisture content of the soil is maintained at a desired level to promote adequate plant growth, while minimizing the frequency at which the soil requires watering. The plant container is designed to provide continuous watering of the plant by the water retained in the reservoir 51, and to retain moisture in the soil as a result of water impervious barrier formed above the upper surface of the soil. If desired, surfactants or other moisture retaining products can be mixed with the soil to enhance the water retention therein.

Other modifications and advantages within the scope of the present invention will become apparent to those skilled in the art. Accordingly, the preferred embodiments discussed herein are intended to be illustrative only, and not restrictive of the scope of the invention, that scope being defined by the following claims and all equivalents thereto.

What is claimed is:

1. A plant container comprising:
    a receptacle for retaining soil therein;
    said receptacle having a substantially continuous and planar rear panel thereon;
    means for mounting said rear panel to a supporting surface; and
    means in said plant container for supplying water to said receptacle;
    said plant container further including a second panel spaced a predetermined distance from said rear panel of said receptacle, said space between said second panel and at least a portion of said rear panel defining said means for supplying water to said receptacle.

2. The plant container as claimed in claim 1, wherein said receptacle has an opened top.

3. The plant container as claimed in claim 1, wherein said receptacle is cup-shaped.

4. The plant container as claimed in claim 1, wherein said means for mounting said rear panel to a supporting surface includes means for removably mounting said rear panel to a supporting surface, and said means for removably mounting is adapted to removably mount the plant container to a substantially vertically oriented supporting surface.

5. The plant container as claimed in claim 1, wherein said means for mounting said rear panel to a supporting surface includes means for removably mounting said rear panel to a supporting surface, said means for removably mounting including at least one opening defined in said rear panel.

6. The plant container as claimed in claim 5, wherein said means for removably mounting includes at least one mounting element received in said at least one opening in said rear panel.

7. The plant container as claimed in claim 6, wherein said at least one mounting element comprises a suction cup.

8. The plant container as claimed in claim 1, wherein said rear panel defines a recessed portion, said recessed portion extending into said receptacle, and wherein said recessed portion of said rear panel defines a further recessed portion extending into said receptacle.

9. The plant container as claimed in claim 1, wherein said receptacle defines a flange along an upper peripheral surface thereof.

10. The plant container as claimed in claim 1, wherein said means for supplying water to said receptacle is integrally formed with said plant container.

11. The plant container as claimed in claim 1, further including means for transporting water between said space defined between said rear panel and said second panel and said receptacle for supplying water from said space to said receptacle.

12. The plant container as claimed in claim 1,
    wherein said means for mounting said rear panel to a supporting surface includes means for removably mounting said rear panel to a supporting surface, wherein said means for removably mounting includes at least one opening in said rear panel for receiving a mounting element; and
    a pattern configured to correspond identically to the configuration of said rear panel of said plant receptacle, said pattern defining an opening therein which is in registration with said at least one opening in said rear panel when said pattern is in registration with said rear panel;
    wherein said pattern is adapted to locate a predetermined position at which said plant container is mountable to said supporting surface.

13. The plant container as claimed in claim 12, wherein said pattern defines a second opening therein, said second opening being in registration with the position of a second mounting element received by said rear panel of said plant container for mounting said plant container to a supporting surface.

14. A plant container comprising:

a receptacle for retaining soil therein;

said receptacle having a rear panel thereon;

means for mounting said rear panel to a supporting surface;

means in said plant container for supplying water to said receptacle;

a second panel spaced a predetermined distance from said rear panel of said receptacle, said space between said second panel and at least a portion of said rear panel defining said means for supplying water to said receptacle;

means for transporting water between said space defined between said rear panel and said second panel and said receptacle;

wherein said mean for transporting includes at least one opening in said rear panel for permitting the flow of water between said space between said rear panel and said second panel and into said receptacle.

15. The plant container as claimed in claim 14 wherein said at least one opening is defined at a position in said rear panel such that water from said space between said rear panel and said second panel is transported through said at least one opening and directly into soil contained within said receptacle.

16. The plant container as claimed in claim 15 wherein said means for transporting includes at least a second opening in said rear panel, said second opening being defined at a position in said rear panel above an upper layer of soil in said receptacle for transporting water from said receptacle into said space.

17. A plant container comprising:

a receptacle for retaining soil therein;

said receptacle having a substantially continuous and planar rear panel thereon;

means for mounting said rear panel to a supporting surface;

means in said plant container for supplying water to said receptacle; and means for retaining moisture in said receptacle, said means for retaining moisture including a layer of water impermeable material applied to an upper layer of soil in said receptacle.

\* \* \* \* \*